Figure 1:
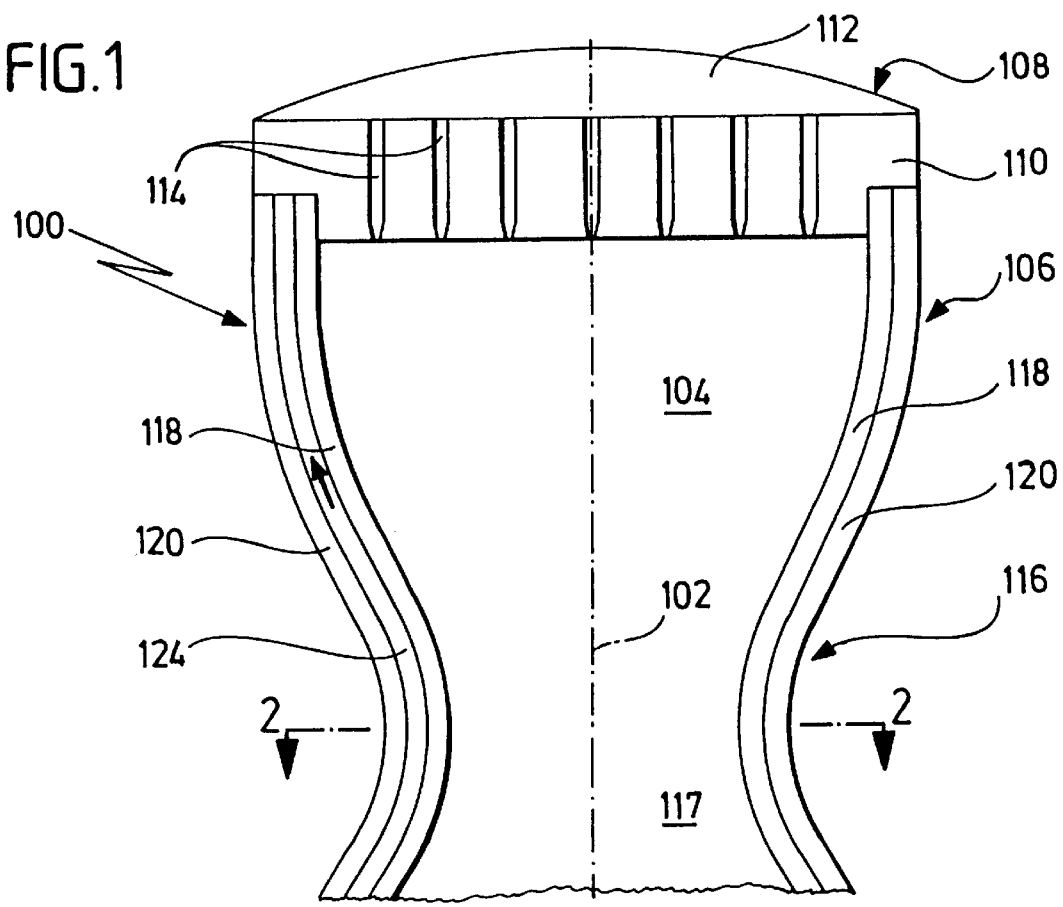

United States Patent

Haidn et al.

[11] Patent Number: 6,151,887
[45] Date of Patent: Nov. 28, 2000

[54] COMBUSTION CHAMBER FOR ROCKET ENGINE

[75] Inventors: Oskar Haidn, Langen-Brettach; Hermann Hald, Leonberg; Michael Lezuo, Jagsthausen; Peter Winkelmann, Kernen, all of Germany

[73] Assignee: Deutsches Zentrum fuer Luft- und Raumfahrt e.V., Bonn, Germany

[21] Appl. No.: 09/270,481

[22] Filed: Mar. 15, 1999

Related U.S. Application Data

[63] Continuation of application No. PCT/EP98/04285, Jul. 10, 1998.

[30] Foreign Application Priority Data

Jul. 17, 1997 [DE] Germany ............... 197 30 674

[51] Int. Cl.[7] .............................................. F02K 9/64
[52] U.S. Cl. ............................................. 60/257; 60/267
[58] Field of Search ........................... 60/257, 266, 267

[56] References Cited

U.S. PATENT DOCUMENTS

| | | |
|---|---|---|
| 2,183,313 | 12/1939 | Goddard . |
| 2,658,332 | 11/1953 | Nicholson . |
| 3,095,283 | 6/1963 | Wheeler . |
| 3,303,654 | 2/1967 | Bringer . |
| 4,840,025 | 6/1989 | Coffinberry ............... 60/219 |
| 5,363,645 | 11/1994 | Pellet ........................ 60/267 |

FOREIGN PATENT DOCUMENTS

| | | |
|---|---|---|
| 0 249 393 | 12/1987 | European Pat. Off. . |
| 0 401 107 | 12/1990 | European Pat. Off. . |
| 33 20 556 | 12/1983 | Germany . |
| 196 16 838 | 10/1996 | Germany . |

OTHER PUBLICATIONS

J. Bill et al., "Polymer–Derived Ceramic Coatings on C/C–Sic Composites," *Journal of the European Ceramic Society*, vol. 16, No. 10, 1996, pp. 1115–1120.

M. Popp and G. Schmidt, "Rocket Engine Combustion Chamber Design Concepts for Enhanced Life," 32nd AIAA/ASME/ASEE Joint Propulsion Conference, Jul. 1–3, 1996, Lake Buena Vista, Florida.

P. Schanz and W. Krenkel, "Description of the Mechanical and Thermal Behaviour of Liquid Siliconized C/C," Proc. 6th European Conference on Composite Materials and Associated Conference (ECCM6), Bordeaux, France, Sep. 20–24, 1993, pp. 715–723.

*Primary Examiner*—Louis J. Casaregola
*Attorney, Agent, or Firm*—Barry R. Lipsitz

[57] ABSTRACT

In order to provide a combustion chamber, in particular for a rocket engine, comprising a combustion area, an inner shell surrounding the combustion area, an outer shell surrounding the inner shell and coolant passages formed between the inner shell and the outer shell, the casing of which has an improved thermal stability and an increased mechanical bearing strength, it is suggested in accordance with the invention that the outer shell be formed from a fibrous ceramic material and the inner shell be formed from a fibrous ceramic material or from graphite.

22 Claims, 8 Drawing Sheets

COMBUSTION CHAMBER FOR ROCKET ENGINE

The present disclosure relates to the subject matter disclosed in International Application No. PCT/EP98/04285 of Jul. 10, 1998, the entire specification of which is incorporated herein by reference.

This application is a continuation of international application number PCT/EP98/04285, filed Jul. 10, 1998. Status of application: Pending.

The present invention relates to a combustion chamber, in particular for a rocket engine, comprising a combustion area, an inner shell surrounding the combustion area, an outer shell surrounding the inner shell and coolant passages formed between the inner shell and the outer shell.

Furthermore, the present invention relates to a process for the production of such a combustion chamber.

Combustion chambers of the type specified at the outset are known, for example, from the article of M. Popp and G. Schmidt: "Rocket Engine Combustion Chamber Design Concepts for Enhanced Life", AIAA 96-3303, 32nd Joint Propulsion Conference from Jun. 1 to 3, 1996, Lake Buena Vista, Fla.; these combustion chambers comprise an inner shell consisting of a copper alloy which is a very good heat conductor and has on its outer side a plurality of fins and an outer shell consisting of nickel which surrounds the inner shell consisting of the copper alloy and bears the mechanical loads during operation of the combustion chamber. In this respect, the outer side and the fins of the inner shell consisting of the copper alloy as well as the inner side of the outer shell consisting of nickel limit coolant passages which can have a coolant, for example, liquid hydrogen flowing through them at a higher pressure in comparison with the pressure in the combustion area. The heat of reaction passed to the wall of the combustion chamber during the combustion in the combustion area is transferred to the coolant in the coolant passages through the heat-conducting inner shell and transported away by the same. Such a cooling process is described as regenerative cooling.

Combustion chambers of the type specified above are produced by making the inner shell consisting of the copper alloy in one piece, forming the fins on the outer side of the inner shell by means of mechanical treatment, filling the spaces between the fins with a wax, applying the outer shell consisting of nickel electrophoretically and, subsequently, melting out the wax contained in the spaces between the fins of the inner shell.

Modern high-power rocket engines have such high combustion area pressures (up to 230 bars) and such high heat fluxes at the inner wall of the combustion chamber that the thermal load-bearing capability and the mechanical bearing strength of the combustion chambers of the type specified above are strained to the utmost and so even small irregularities during cooling operations, for example, a short-term drop in pressure in the cooling circuit can lead in fractions of a second to a thermal breakdown, for example, due to melting of the copper alloy of the inner shell.

In order to increase the admissible combustion area pressures and temperatures, combustion chambers have already been suggested (likewise in the article cited above) with a so-called transpiration cooling. In the case of transpiration cooling, part of the coolant is pressed out of the coolant passages through pores in the inner shell of the combustion chamber into the combustion area where it forms in front of the inner wall of the combustion chamber a boundary-layer film which screens off the hot products of reaction from the wall and reduces the convective transfer of heat from the combustion area into the inner shell of the combustion chamber. If a liquid coolant is used, an additional cooling effect is brought about in that the coolant vaporizes during the formation of the boundary-layer film and thereby absorbs latent heat.

So far, porous metals as well as porous compact ceramics have been suggested as material for the porous inner shell of a transpiration-cooled combustion chamber.

When using porous metals it is, however, disadvantageous that in the case of any local tearing of the boundary-layer film due to local overheating a so-called "hot spot" can occur, in the area of which the metal sinters on its surface which leads to closure of the pores of the porous metal. On account of the pore closure, the cooling effect is reduced at the relevant location and so the sintering or caking process itself is reinforced and leads to a breakdown in the porous metal structure even to the point of melting.

The use of porous compact ceramics has the disadvantage that these ceramics have a high brittleness and a high sensitivity to thermal shocks. Cracks, which lead to an uneven passage of coolant and cause the boundary-layer film to become unstable, can therefore result in these ceramics on account of the high temperature gradients which occur, in particular, during the starting up and stopping of an engine.

On account of the specified disadvantages, a reliable operation with the combustion chamber concepts presented thus far is possible only when extremely large flows of cooling masses are blown in. This would, however, result in considerable losses in the efficiency of the engine, namely a lower specific momentum.

The object underlying the present invention is therefore to provide a combustion chamber of the type specified at the outset, the casing of which has an improved thermal stability and an increased mechanical bearing strength.

This object is accomplished in accordance with the invention, in a combustion chamber with the features of the preamble to claim 1, in that the outer shell is formed from a fibrous ceramic material and the inner shell is formed from a fibrous ceramic material or from graphite.

A fibrous ceramic material is to be understood as a material which consists of fibers embedded into a ceramic matrix.

Fibrous ceramics, also known under the term CMC (for "Ceramic Matrix Composites"), are characterized by a high temperature stability and an extremely low sensitivity to thermal shocks, as a result of which these materials are suitable as material for the inner shell of the combustion chamber. In particular, when using a fibrous ceramic material for the inner shell "hot spots" which occur temporarily do not lead directly to a breakdown in the material. The inventive combustion chamber thus has a high tolerance to damage.

On account of the fiber content, the fibrous ceramic materials have a high tensile strength, as a result of which these materials are suitable as material for the outer shell of the combustion chamber. Since not only the inner shell but also the outer shell of the inventive combustion chamber are formed from a material resistant to high temperatures, the combustion chamber can be operated as a "hot structure", i.e. the operating temperature of the inner and the outer shell can be considerably higher than in the case of conventional combustion chambers, whereby the difference in temperature between the combustion area and the casing of the combustion chamber is reduced and the leakage heat flux from the combustion area into the casing of the combustion chamber is decreased. As a result of this, a smaller cooling capacity is sufficient to cool the casing of the combustion chamber and so the flow rate of coolant in the coolant passages can be reduced which, again, makes it possible to use smaller pumps for conveying the coolant, which, on account of their lower weight, allow an increase in the payload capacity of the rocket system. Moreover, the rotational speed of the pumps can be reduced and thus their service life extended.

Furthermore, the fibrous ceramic materials have a very small thermal coefficient of expansion $\alpha$ and so during operation only a small thermal expansion of inner shell and outer shell occurs. Fatigue of the material of the inner shell and the outer shell is thus avoided even with frequent changing of the operational state.

Due to the fact that a fibrous ceramic material is used not only for the inner shell but also for the outer shell of the combustion chamber, the problem of mechanical stresses on account of a difference in the thermal expansion of the inner and the outer shell, which plays an important part in the case of conventional combustion chambers which comprise an inner shell consisting of a copper alloy and an outer shell consisting of nickel, almost does not occur.

Furthermore, the fibrous ceramic materials have a low specific weight and so the weight of the combustion chamber and thus of the engine altogether can be reduced which leads to an increase in the payload capacity of the entire rocket system.

Instead of a fibrous ceramic material, graphite can also be used as material of the inner shell. Carbon has a high temperature stability, in particular, in a hydrogen or vapor atmosphere such as that present as a rule at the edge of a combustion area due to the more or less complete combustion. The use of a fibrous ceramic material for the inner shell is, however, preferred since it has a greater mechanical strength and with respect to its microstructure is more varied in its design as a result of the selection of the starting materials and as a result of the type of production process.

In a preferred development of the inventive combustion chamber, the fibrous ceramic material of the inner shell and/or the outer shell comprises carbon fiber-reinforced carbon (C/C), i.e. a material which consists of carbon fibers embedded into a carbon matrix.

In order to prevent coolant from the coolant passages passing to the outside of the combustion chamber, it is advantageously provided for the material of the outer shell to have no porosity.

It is preferably provided for the material of the outer shell to comprise a carbon fiber-reinforced silicon carbide. Carbon fiber-reinforced silicon carbide (designated as C/SiC or C/C—SiC depending of the production process used) consists in the case of C/C—SiC of areas isolated from one another and consisting of a carbon matrix, into which carbon fibers are inserted (C/C cells) and which, for their part, are embedded into a matrix consisting of silicon carbide. The sheathing consisting of silicon carbide protects the C/C cells from oxidation and results in a good stability at extremely high temperatures of up to 1800° C. during continuous operation and up to 2700° C. during short-term operation.

A development of the inventive combustion chamber is particularly preferred, with which the material of the outer shell comprises a C/C—SiC material. In this respect, this is a carbon fiber-reinforced silicon carbide which can be produced by means of a so-called liquid siliconizing process which is described, for example, in the article of P. Schanz and W. Krenkel: "Description of the Mechanical and Thermal Behaviour of Liquid Siliconized C/C", Proc. 6th Europ. Conf. on Composite Materials and Associated Conference (ECCM6), Bordeaux, Sep. 20 to 24, 1993 and will be explained in greater detail in the following and the microstructure of which can be varied in a large range during the production process as a result of the selection of the starting materials and as a result of the type of processing.

If no transpiration cooling of the combustion chamber is desired, it may be provided for the material of the inner shell of the combustion chamber to have no porosity.

In this case, it is of advantage for the reasons already specified above when the material of the inner shell comprises a carbon fiber-reinforced silicon carbide, in particular, a C/C—SiC material.

Greater combustion chamber pressures and temperatures can, however, be reached when the combustion chamber is subject at least partially to transpiration cooling, preferably at the areas which are thermally strained to a particularly great extent, such as, for example, the nozzle throat. In order to make a transpiration cooling possible, it is provided for the material of the inner shell to comprise a material with an open porosity. A material with an open porosity is to be understood as a material, the pores of which are not isolated from one another but form a coherent cavity system so that a fluid can pass from one side of a body formed from the material with an open porosity through the cavity system to the opposite side of the body.

Preferred materials with an open porosity are a porous C/C material (carbon fiber-reinforced carbon) or porous graphite.

The degree of porosity, i.e. the percentage proportion of the pore volume in the total volume of the material having an open porosity, can be spatially constant within the inner shell of the combustion chamber.

In order to obtain an optimum generation of the cooling boundary-layer film in the case of the transpiration cooling it is, however, of advantage when the degree of porosity of the material of the inner shell having an open porosity varies in a radial direction of the combustion chamber.

It is particularly favorable when the degree of porosity of the material of the inner shell having an open porosity increases towards the inner side of the inner shell. As a result, the fact is taken into account, on the one hand, that a temperature gradient is present in the inner shell of the combustion chamber and so the coolant expands on the way to the hot inner side of the inner shell. Furthermore, an additional porosity in the region of the inner side of the inner shell can serve to attenuate variations in the combustion area pressure. The pore volume in the area of the inner side of the inner shell acts as a compensatory volume which is accessible in a restricted manner in view of the small pore access cross sections. Variations in the combustion area pressure can therefore be compensated in that during an increase in the combustion area pressure a flow of fluid into the pores of the inner shell takes place and during a drop in the combustion area pressure a flow of fluid out of the pores of the inner shell.

Furthermore, it may also be provided for the degree of porosity of the material of the inner shell having an open porosity to vary in a longitudinal direction of the combustion chamber in order to adjust the amount of coolant supplied locally to the combustion area for forming the boundary-layer film to the respective course of temperature and pressure in the combustion chamber.

In a particularly preferred development of the inventive combustion chamber, use is made of the process of film cooling. Film cooling is thereby to be understood as a cooling process, with which, as with the transpiration cooling, as well, a coolant is supplied to the combustion area for forming a boundary-layer film, wherein the coolant in the case of the film cooling is, however, supplied through a blow-in gap or a porous area of the inner shell which is arranged upstream of the combustion chamber wall surface to be cooled by the boundary-layer film which is formed whereas the coolant in the case of the transpiration cooling is supplied over a large area through pores in the actual combustion chamber wall surface to be cooled.

In the case of the film cooling, the coolant supply area and the film cooling area therefore follow one another in flow direction of the gas mixture in the combustion area whereas in the case of the transpiration cooling the coolant supply area and the transpiration cooling area coincide.

In order to make such a film cooling of the combustion chamber possible, the inner shell of the combustion chamber has a coolant supply area, through which the coolant can be supplied to the combustion area, and a film cooling area which comprises no porous material, wherein the film cooling area follows the coolant supply area in longitudinal direction of the combustion chamber, in particular, essentially in flow direction of the gas mixture in the combustion area.

In order to form the boundary-layer film, the coolant may be supplied to the combustion area in that the coolant supply area of the inner shell comprises a material with an open porosity.

Alternatively or supplementary hereto, it may also be provided for the coolant supply area of the inner shell to be penetrated by at least one injection passage which connects a coolant passage with the combustion area.

The methods of film cooling and transpiration cooling can also be utilized in the case of an inventive combustion chamber in a combined manner when the inner shell of the combustion chamber has a transpiration cooling area which comprises a material with an open porosity and follows the film cooling area in longitudinal direction of the combustion chamber.

Furthermore, it may be provided for an area of the inner shell to have a coating consisting of a TBC material on its inner side. A TBC material (from "thermal barrier coating") is to be understood as a material with a low heat conductivity. Consequently, a steep temperature gradient is formed in the TBC material on the inner side of the inner shell and so the temperatures and temperature gradients in the material of the inner shell are reduced. Coatings consisting of a TBC material are preferably used at the locations of the inner shell which are not transpiration cooled but cooled regeneratively or film cooled.

It is of advantage when the coolant passages have a cross section varying in longitudinal direction of the combustion chamber. In this way, the local coolant flow can be adapted to the respective flow of heat into the coolant which occurs locally.

The coolant passages may be designed as recesses on the outer side of the inner shell and/or as recesses on the inner side of the outer shell.

Furthermore, it is favorable when the inventive combustion chamber has an injection head which is formed from a fibrous ceramic material. As a result, the occurrence of mechanical tensions between the combustion chamber casing and the injection head on account of different thermal coefficients of expansion is avoided.

It is particularly favorable when the injection head is designed in one piece with the inner shell and/or the outer shell of the combustion chamber. In this case, the injection head need not be manufactured separately and later attached but can be produced together with the combustion chamber casing in a manner which saves on costs and time.

If it is advantageously provided for the material of the injection head to comprise a material with an open porosity, the injection head can also be cooled by means of transpiration cooling.

The additional object underlying the invention is to provide a process for the production of a combustion chamber, in particular, for a rocket engine, as defined in any one of claims 1 to 21 which makes possible as simple and cost-saving a manufacture of the combustion chamber as possible and during the course of which the desired material properties of the combustion chamber casing can be set in a simple manner.

The inventive process for the production of a combustion chamber comprises the following process steps:

producing an inner shell preliminary member from a fiber reinforced plastic;

pyrolyzing the inner shell preliminary member;

applying an outer shell preliminary member consisting of fiber reinforced plastic to the pyrolyzed inner shell preliminary member;

pyrolyzing the structural unit formed from the outer shell preliminary member and the inner shell preliminary member; and supplying silicon to the pyrolyzed outer shell preliminary member to form a silicon carbide matrix in the material of the outer shell.

The inventive process offers the advantage that the combustion chamber casing is formed as an integral structure from an inner shell comprising a fibrous ceramic material and from an outer shell comprising a fiber reinforced silicon carbide without subsequent joining steps being necessary to join individual components together.

Due to the fact that the process steps carried out on the inner shell preliminary member are repeated on the outer shell preliminary member, the number of devices required for carrying out the production process is kept small.

In particular, the silicon can be supplied to the pyrolyzed outer shell preliminary member using a liquid siliconizing process which, in contrast to known silane processes, is particularly well suited for the siliconizing of optionally thick outer shell preliminary members.

In principle, fibrous ceramics, such as, e.g., C/SiC, can also be produced, however, by way of processes such as the "liquid polymer infiltration" (LPI) or the "chemical vapor infiltration" (CVI).

If the injection head is intended to be designed in one piece with the inner shell and/or the outer shell, the inner shell preliminary member and/or the outer shell preliminary member are to be designed such that they comprise an injection head preliminary member.

During the first pyrolyzation of the inner shell preliminary member, a porous material results which contains fibers embedded into a carbon matrix. The degree of porosity of this material is, typically, approximately 20%.

A lower degree of porosity, such as that generally required for the purposes of transpiration cooling, may be achieved by the inner shell preliminary member being infiltrated with a precursor material following the first pyrolyzation and subsequently pyrolyzed again.

This procedure of reinfiltration with a precursor material and subsequent renewed pyrolysis is advantageously repeated until a predetermined degree of porosity of the material of the inner shell preliminary member is reached.

If a higher degree of porosity is desired, an additive, which outgasses during pyrolyzation, can be added to the material of the inner shell preliminary member during the production of the inner shell preliminary member from the fiber reinforced plastic so that a predetermined degree of porosity of the inner shell preliminary member is reached.

Decisive for the microstructure of the material obtained from the fiber reinforced plastic due to pyrolysis is the strength of the bonding between the fibers and the plastic material, into which the fibers are embedded.

The strength of the fiber-matrix bonding can be influenced by a pretreatment of the fiber structure used for the production of the inner shell preliminary member from the fiber reinforced plastic prior to the production of the inner shell preliminary member.

A coating of the fiber structure or a thermal pretreatment, in particular, a heating of the fiber structure can be considered as suitable pretreatments.

The microstructure of the material of the outer shell can also be influenced by a suitable pretreatment of the fiber structure used for applying the outer shell preliminary member consisting of the fiber reinforced plastic prior to the application of the outer shell preliminary member.

It may be provided, for example, for the fiber structure used for applying the outer shell preliminary member consisting of the fiber reinforced plastic to be heated prior to the application of the outer shell preliminary member.

Particularly when using a carbon fiber structure, the fiber structure is preferably heated during the thermal pretreatment to a temperature in the range of 600° C. to 900° C. Without any thermal pretreatment, a carbon fiber-reinforced carbon material (C/C material), which has a microstructure with a segmentation into C/C cells isolated from one another and crack-free as such, results during the pyrolysis of a carbon fiber-reinforced plastic. As a result of a thermal treatment in the specified temperature range, the fiber-matrix bonding decreases to such an extent that during the pyrolysis a C/C material results with a microstructure which still has a segmentation into C/C cells isolated from one another, wherein these C/C cells are, however, themselves penetrated by microcracks so that the C/C material has an increased porosity.

If, on the other hand, the fiber structure is heated to a temperature of more than 900° C., the fiber-matrix bonding decreases so considerably that the carbon fibers detach themselves from the shrinking matrix during the pyrolysis and a C/C material results which has no segmentation into individual C/C cells but is essentially penetrated homogeneously by microcracks of the carbon matrix.

The coolant passages of the combustion chamber can be formed on the inner side of the outer shell in that prior to the application of the outer shell preliminary member loss mass members having the desired shape of the coolant passages are applied to the pyrolyzed inner shell preliminary member.

The removal of the loss mass members is particularly simple when the loss mass members consist of such a material that they are thermally destroyed during the pyrolization of the structural unit formed from the outer shell preliminary member and the inner shell preliminary member.

It is, however, also possible to remove the loss mass members again only after silicon has been supplied to the pyrolyzed outer shell preliminary member.

If the finished inner shell is intended to comprise, at least partially, a material with an open porosity, the outer sides of the loss mass members bordering on the outer shell preliminary member are advantageously sealed, for example, by applying a separating agent or a ceramic slurry in order to prevent any silicon from entering the inner shell during the siliconization of the outer shell preliminary member.

Alternatively or supplementary thereto, it is possible to form coolant passages on the outer side of the inner shell preliminary member prior to the application of the outer shell preliminary member. This can be done by a mechanical treatment of the inner shell preliminary member, for example, by milling.

If the finished inner shell is intended to comprise a material with an open porosity, i.e. not be completely siliconized, areas of the outer side of the inner shell preliminary member bordering on the coolant passages are provided with a separating agent in order to prevent the silicon supplied to the outer shell preliminary member from entering the inner shell preliminary member.

The separating agent is advantageously removed after the supply of silicon to the pyrolyzed outer shell preliminary member by flushing the coolant passages with a substance dissolving the separating agent.

Alternatively or supplementary to the application of a separating agent, the coolant passages may be filled with a hardenable material prior to the application of the outer shell preliminary member in order to prevent the silicon from entering the inner shell during the siliconization of the outer shell preliminary member.

The hardenable material is advantageously removed chemically and/or mechanically after the supply of silicon to the pyrolyzed outer shell preliminary member.

Furthermore, when the finished inner shell is intended to comprise, at least partially, a material with an open porosity, contact areas of the outer side of the inner shell preliminary member bordering on the outer shell will be sealed prior to the application of the outer shell preliminary member in order to prevent any silicon from entering the inner shell during the siliconization of the outer shell preliminary member.

The sealing of the contact areas is brought about, for example, by means of a plasma coating process, by applying a ceramic slurry to the contact areas or by way of other suitable processes.

If it is desirable for an area of the inner shell to have no porosity, silicon will be supplied to the corresponding area of the inner shell preliminary member for forming a silicon carbide matrix in the material of the inner shell.

Furthermore, it may be provided for the area of the inner shell, to which the silicon has been supplied, to be provided on its inner side with a coating consisting of a TBC material in order to reduce the temperature, to which the siliconized material of the inner shell is subjected during operation of the combustion chamber.

In order to produce a combustion chamber with an inner shell which has a first section, which comprises a material with an open porosity, and has an additional section, the material of which is not porous, a first section of the inner shell preliminary member is produced from a fiber reinforced plastic and this first section of the inner shell preliminary member is pyrolyzed. Subsequently, contact areas of the outer side of the first section of the inner shell preliminary member are sealed in order to prevent the silicon from entering the first section of the inner shell preliminary member during a later siliconization of the additional section of the inner shell preliminary member as well as of the outer shell preliminary member. Thereupon, an additional section of the inner shell preliminary member, which borders on the first section of the inner shell preliminary member at at least one of the contact areas, is produced from a fiber reinforced plastic and pyrolyzed. Finally, the outer shell preliminary member consisting of fiber reinforced plastic is applied to the entire pyrolyzed inner shell preliminary member, and the outer shell preliminary member is pyrolyzed and siliconized, as described above.

Alternatively thereto, a porosity graduated in longitudinal direction can also be achieved by way of partial subsequent infiltration and renewed pyrolyzation of the inner shell preliminary member following the first pyrolyzation step.

Additional features and advantages of the invention are the subject matter of the following description and the drawings illustrating embodiments.

Figure 2:
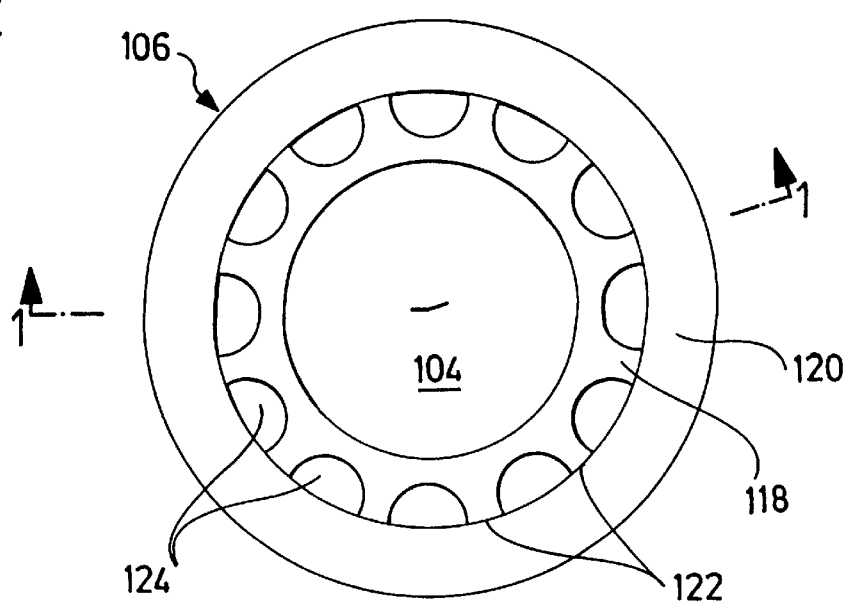
Figure 3:
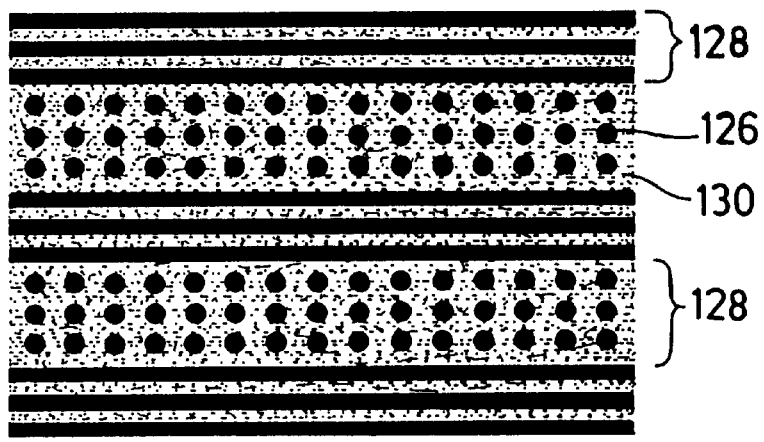
Figure 4:
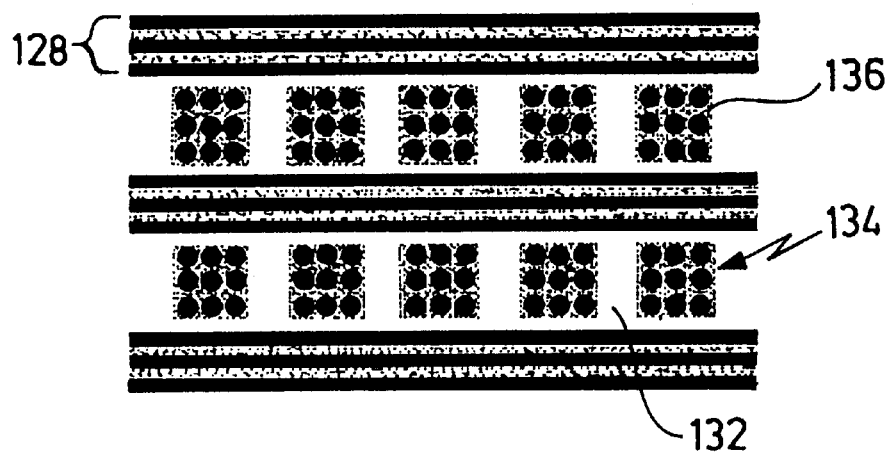
Figure 5:
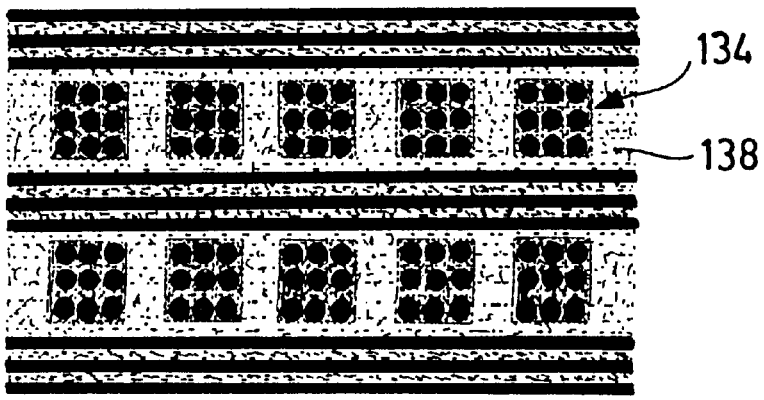
Figure 6:
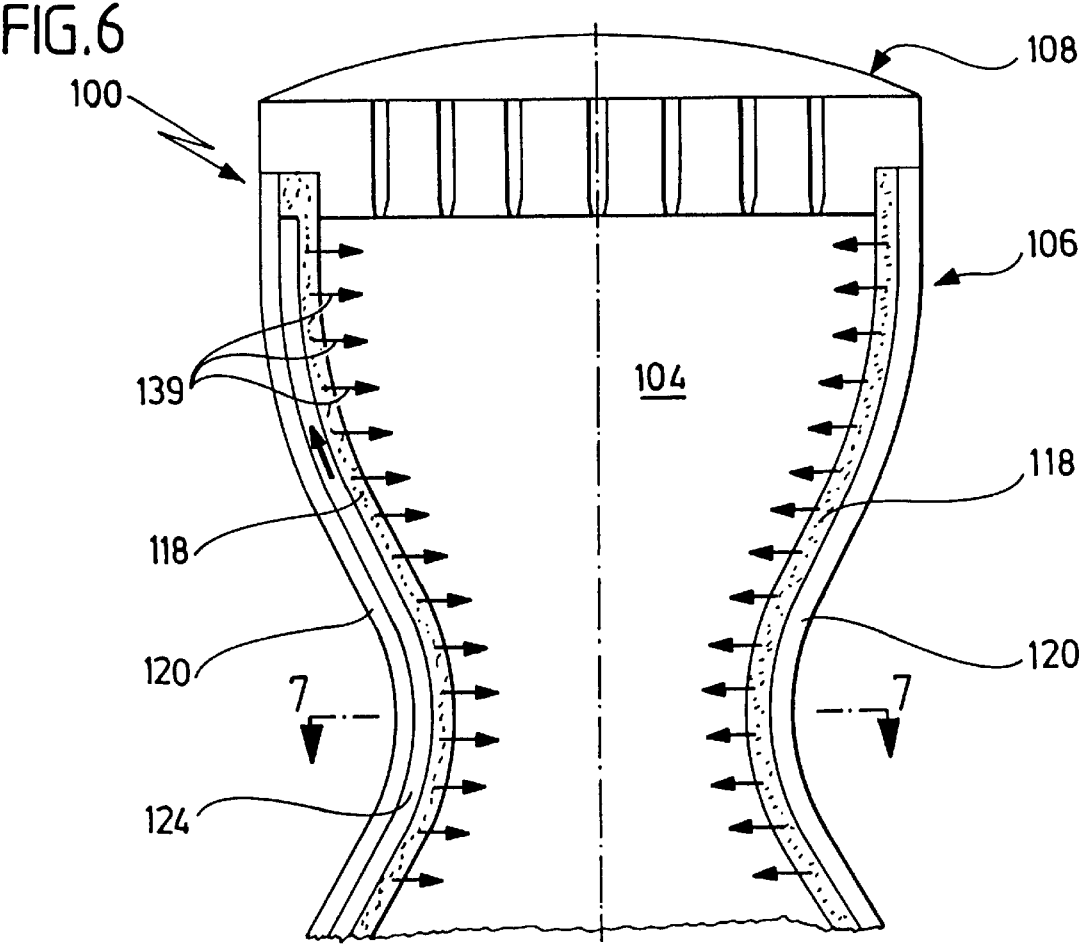
Figure 7:
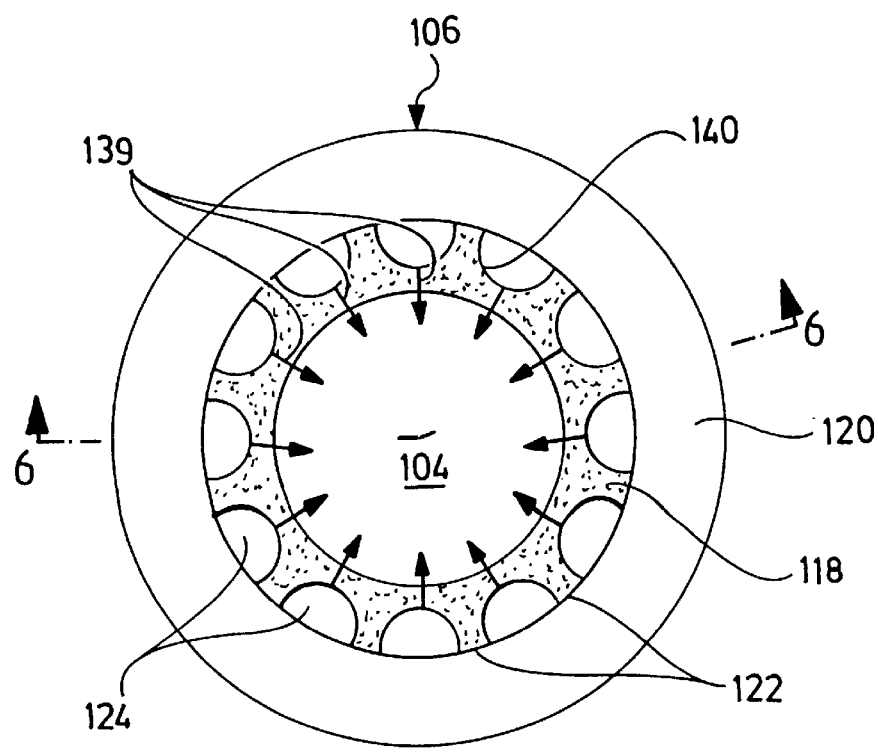
Figure 8:
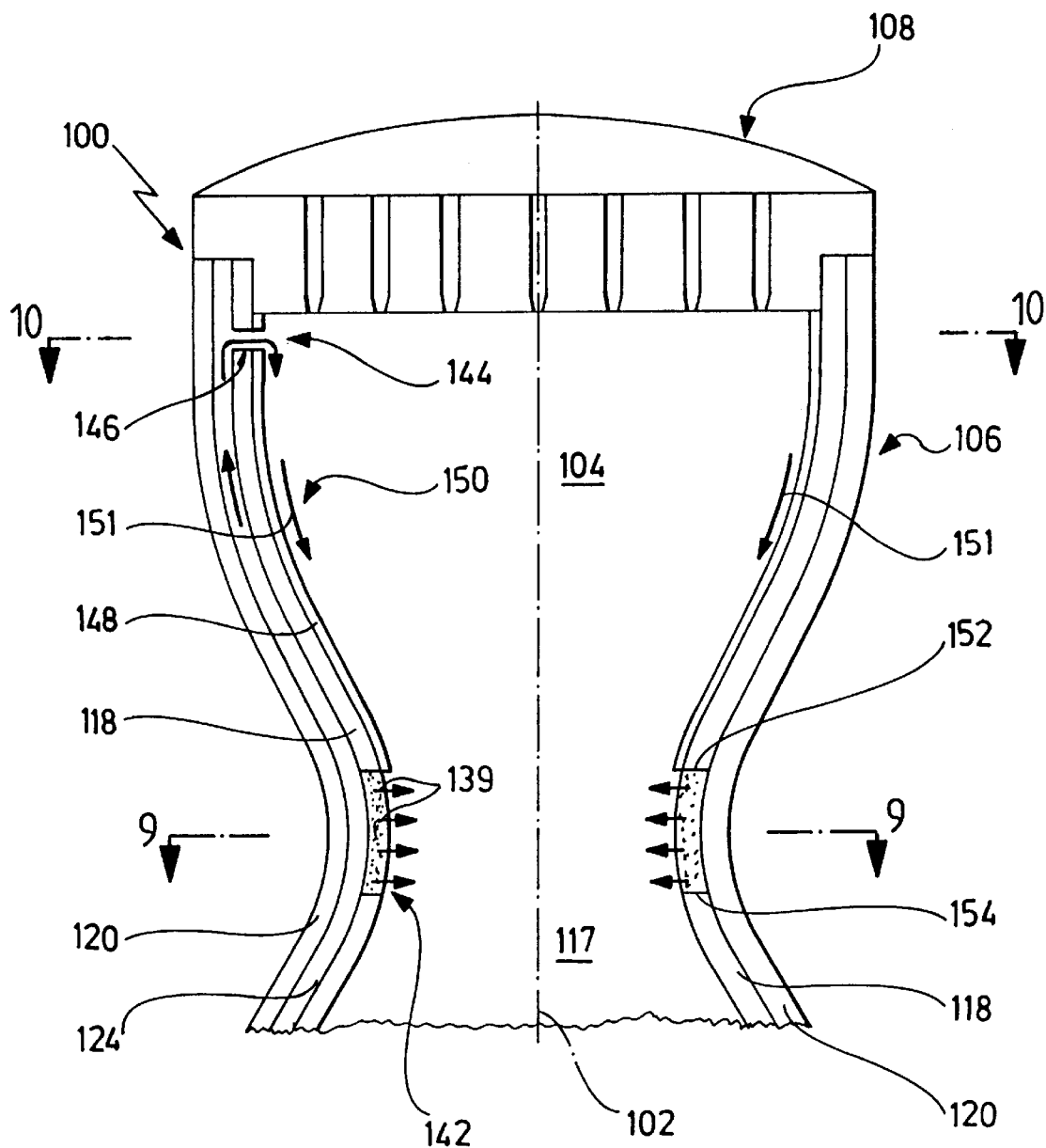
Figure 9:
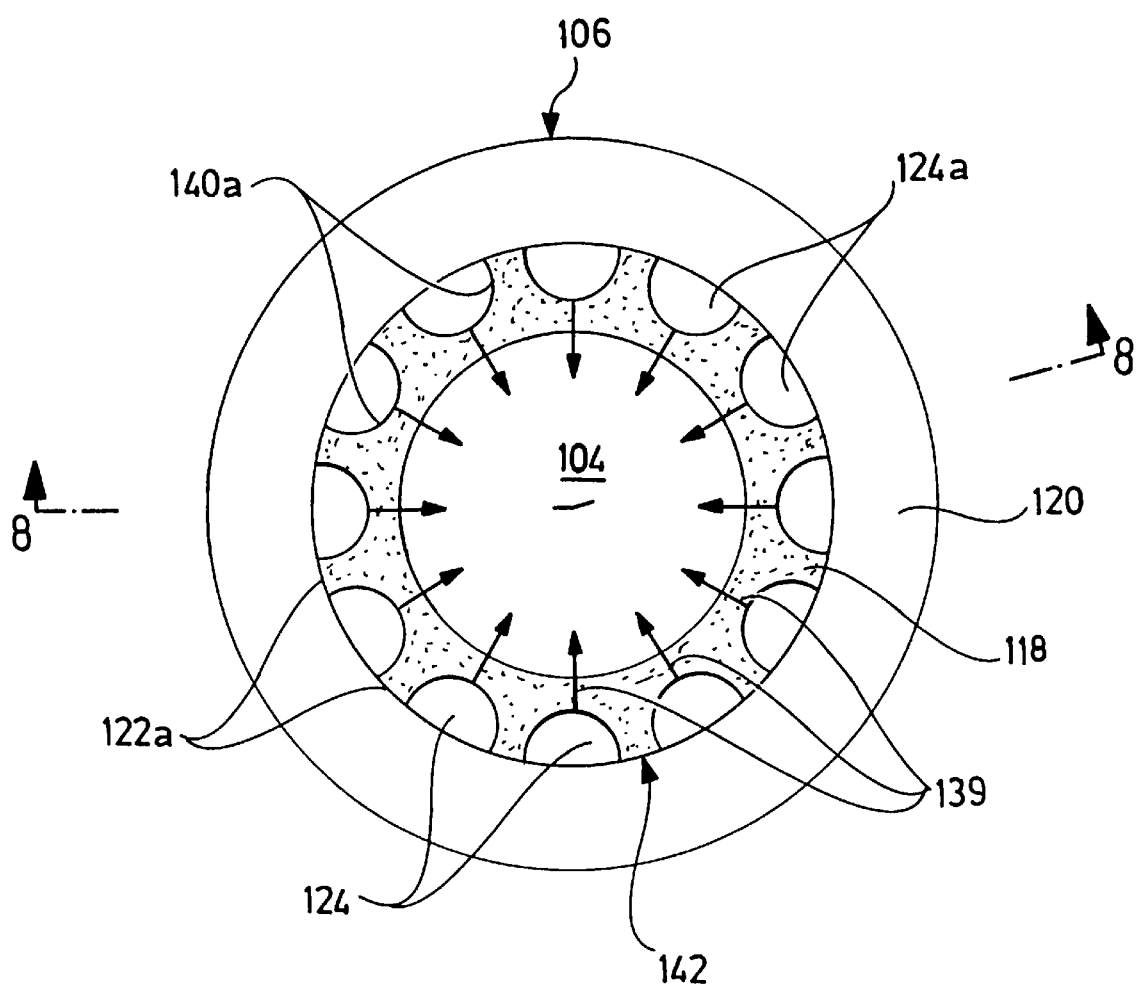
Figure 10:
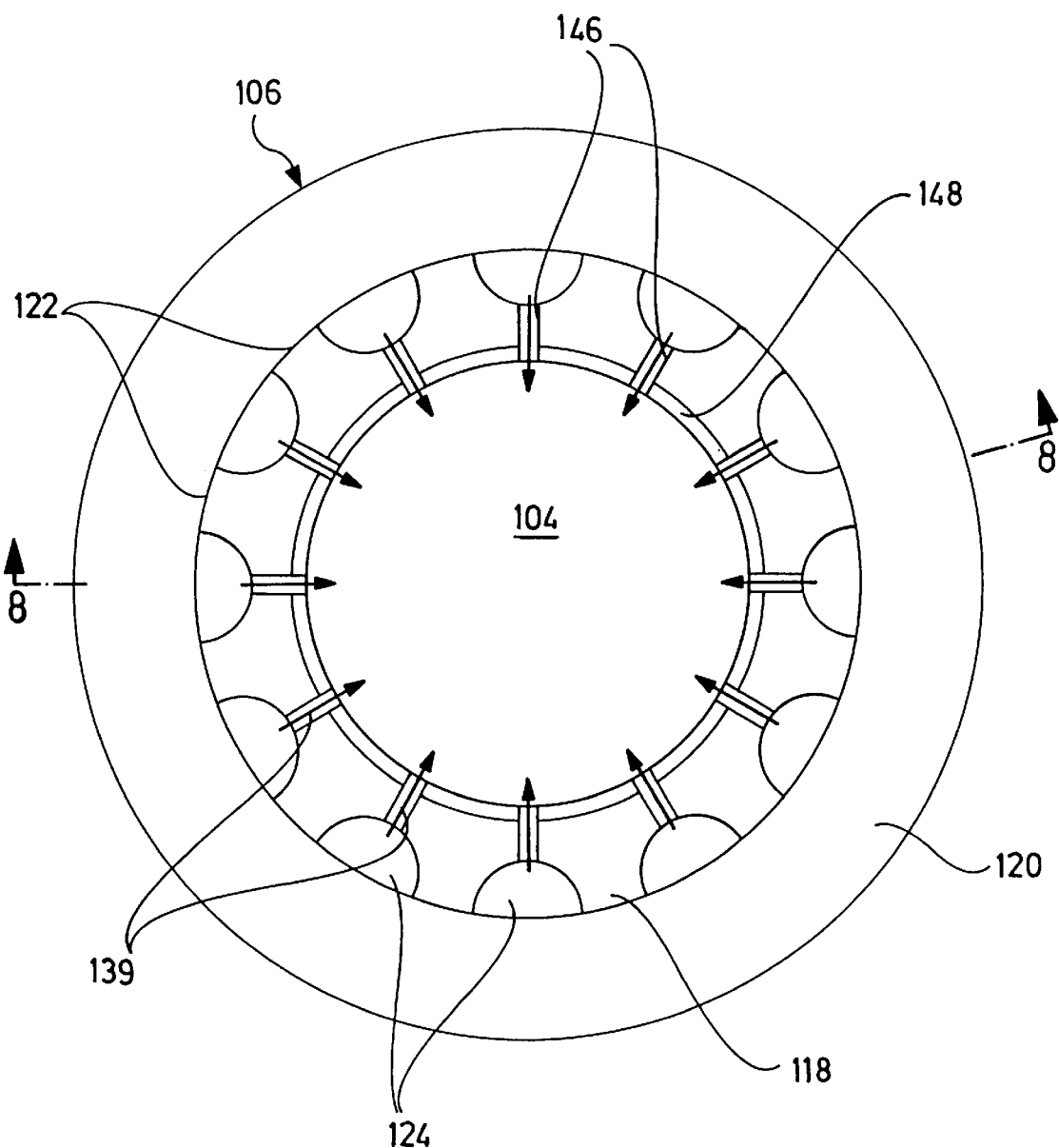
Figure 11:
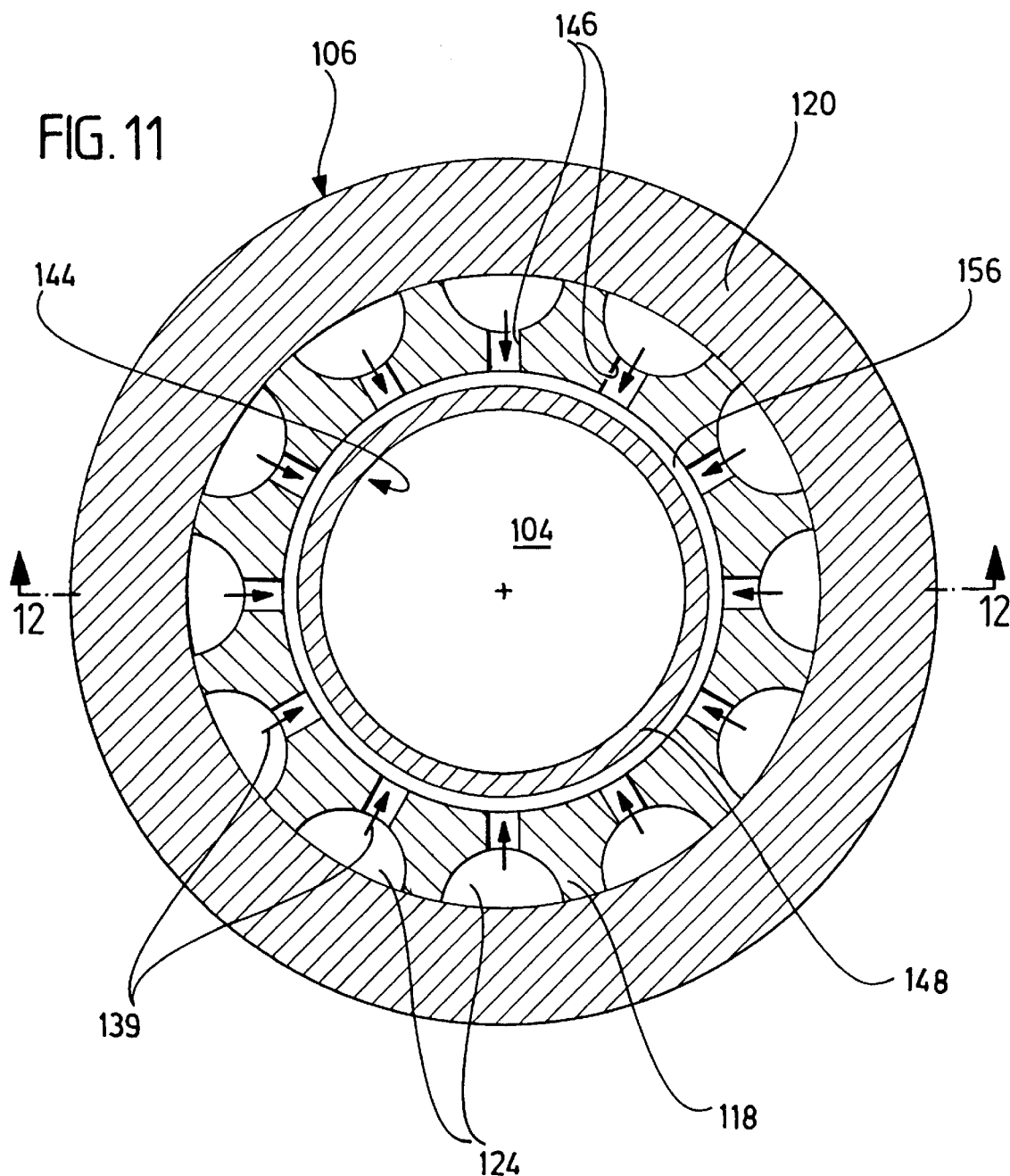
Figure 12:
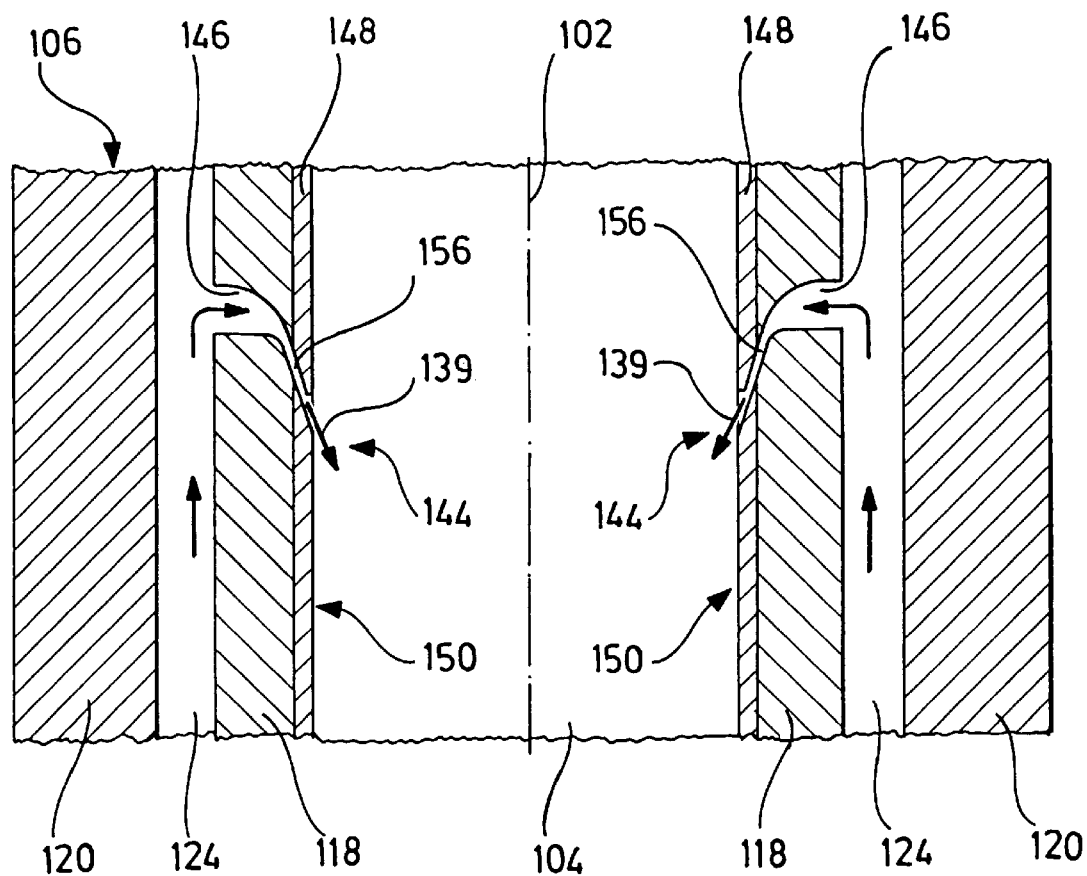

In the drawings:

| FIG. 1 | shows a schematic longitudinal section through a first embodiment of a combustion chamber with a non-porous inner shell and exclusive regenerative cooling; |
|---|---|
| FIG. 2 | shows a schematic cross section along the line 2-2 in FIG. 1; |
| FIG. 3 | shows a schematic cross section through a carbon fiber-reinforced plastic; |
| FIG. 4 | shows a schematic cross section through a C/C material; |
| FIG. 5 | shows a schematic cross section through a C/C-SiC material; |
| FIG. 6 | shows a schematic longitudinal section through a second embodiment of a combustion chamber with a porous inner shell and exclusive transpiration cooling; |
| FIG. 7 | shows a schematic cross section along the line 7-7 in FIG. 6; |
| FIG. 8 | shows a schematic longitudinal section through a third embodiment of a combustion chamber which has a transpiration cooled section with a porous inner shell and a film cooled section with a non-porous inner shell provided with a TBC coating; |
| FIG. 9 | shows a schematic cross section along the line 9-9 in FIG. 8; |
| FIG. 10 | shows a schematic cross section along the line 10-10 in FIG. 8; |
| FIG. 11 | shows a schematic cross section through a fourth embodiment of a combustion chamber which has a film cooled section; and |
| FIG. 12 | shows a detail from a schematic longitudinal section through the fourth embodiment of a combustion chamber along the line 12-12 in FIG. 11. |

The same or functionally equivalent elements are designated in all the Figures by the same reference numerals.

A first embodiment of a combustion chamber designated as a whole as 100 and illustrated in FIGS. 1 and 2 comprises a combustion area 104 which is essentially rotationally symmetric with respect to a longitudinal axis 102 of the combustion chamber 100 and is surrounded laterally by a combustion chamber casing 106.

One end of the combustion area 104 (upper end in the illustration of FIG. 1) is closed by an injection head 108 which is arranged on an upper edge of the combustion chamber casing 106.

The injection head 108 comprises an essentially cylindrical injection nozzle plate 110 arranged coaxially to the longitudinal axis 102 of the combustion chamber 100 as well as an oxidant chamber 112 which is arranged on the side of the injection nozzle plate 110 remote from the combustion area 104 and can be supplied with an oxidizing agent subject to pressure, for example, liquid oxygen from an oxidant tank via a line (not illustrated).

The injection nozzle plate 110 is penetrated by several injection nozzles 114 for the oxidizing agent which are aligned, for example, parallel to the longitudinal axis 102 of the combustion chamber 100 and connect the oxidant chamber 112 with the combustion area 104 so that the oxidizing agent subject to pressure can be injected out of the oxidant chamber 112 through the injection nozzles 114 into the combustion area 104 of the combustion chamber 110.

Furthermore, the injection nozzle plate 110 is provided with injection nozzles for a reducing agent (not illustrated for the sake of clarity) which are connected, on the one hand, with a reservoir of reducing agent subject to pressure, for example, liquid hydrogen and, on the other hand, to the combustion area 104 so that the reducing agent can be injected through these injection nozzles into the combustion area 104 of the combustion chamber 100 in order to react with the oxidizing agent therein, thereby generating heat.

The combustion chamber casing 106 surrounding the combustion area 104 laterally is shaped such that the essentially circular cross sectional area of the combustion area 104 decreases with increasing distance from the injection head 108 until it reaches a minimum in the region of a nozzle throat 116. On the side of the nozzle throat 116 remote from the injection head 108, the cross sectional area of the combustion area 104 increases again. In this region, the combustion area 104 merges into a nozzle region 117.

The combustion chamber casing 106 comprises, as is best apparent from the illustration in FIG. 2, an inner shell 118, the inner side of which limits the combustion area 104 of the combustion chamber 100, and an outer shell 120, the outer side of which forms an outer side of the combustion chamber 100.

It may be provided for the inner shell 118 and/or the outer shell 120 to be designed in one piece with the injection head 108.

The inner shell 118 and the outer shell 120 of the combustion chamber casing 106 border on one another at contact surfaces 122 which are spaced from one another in circumferential direction of the combustion chamber 100 and extend in longitudinal direction of the combustion chamber 100.

A coolant passage 124 is arranged between every two adjacent contact surfaces 122. Each of the coolant passages 124 is designed as a recess on the outer side of the inner shell 118 which extends essentially in longitudinal direction of the combustion chamber 100 and has an essentially semicircular cross section.

Alternatively or supplementary thereto, the coolant passages can also be designed as recesses on the inner side of the outer shell 120.

Apart from a semicircular cross section, the coolant passages 124 can also have a different cross section, for example, a triangular, rectangular or trapezoidal cross section. Furthermore, the cross-sectional shape and area may vary in longitudinal direction of the combustion chamber 100 in accordance with the local cooling requirements.

Each of the coolant passages 124 is connected at an end remote from the injection head 108 with a coolant supply line (not illustrated) and at its end facing the injection head 108 with a coolant discharge line (not illustrated) and has a gaseous or liquid coolant flowing through it, for example, gaseous or liquid hydrogen or entionized water.

If the same substance which is injected into the combustion area 104 as reducing agent together with the oxidizing agent is used as coolant, for example, gaseous or liquid hydrogen, it may be provided for the coolant discharge channel to be connected to the injection nozzles for the reducing agent provided in the injection nozzle plate 110 so that the coolant can pass into the combustion area 104 through the injection head 108 after flowing through the coolant passages 124 in order to be burned off therein.

The inner shell 118 of the first embodiment of the combustion chamber 100 consists of a C/C—SiC material, i.e. of carbon fiber-reinforced carbon which is embedded into a silicon carbide matrix. The morphology and the production of the C/C—SiC material will be explained in greater detail in the following.

C/C—SiC is a composite material from the materials class of fiber ceramics (CMC for "ceramic matrix composites") and is characterized by stability at extremely high temperatures of up to 1800° C. during continuous operation, up to 2700° C. during short-term operation. It is a light-density material with a density of approximately 2 g/cm³, from which thin-walled, shell-like structures with a complex shape can be manufactured just as well as thick-walled structural members. C/C—SiC has an extremely low sensitivity to thermoshocks and a very small thermal coefficient of expansion α in the range of $10^{-6}$ to $4 \times 10^{-6}$.

On account of these properties, the inner shell 118 consisting of C/C—SiC is particularly suitable for resisting the high heat flux out of the combustion area 104 during the combustion process and for conducting the heat conveyed from the combustion area 104 to the coolant in the coolant passages 124, by which the heat is transported away from the combustion chamber casing 106. This method of cooling, with which the coolant does not come into direct contact with the combustion gases in the combustion area 104, is designated as regenerative cooling.

The outer shell 120 serves to absorb the considerable tensile stresses which occur as a result of the high combustion area internal pressure of up to 230 bars during combustion.

In the first embodiment of the combustion chamber 100, the outer shell 120 also consists of a C/C—SiC material which has a high tensile strength on account of its carbon fiber content.

In order to produce the combustion chamber casing 106 of the first embodiment of a combustion chamber 100 described above, the following steps are taken:

First of all, an inner shell preliminary member consisting of a carbon fiber-reinforced plastic (CFK), a so-called "green member", is produced from a carbon fiber structure and a precursor polymer which has a high residual carbon content following pyrolysis. During the production of this preliminary member, the known resin injection process or the known autoclave process can be used.

FIG. 3 shows schematically the design of the carbon fiber-reinforced plastic material of the inner shell preliminary member. The carbon fiber structure consists of successive carbon fiber layers 128 consisting of individual carbon fiber filaments 126 with a diameter of, typically, 7 μm, wherein textile woven layers with a bi-directional weave pattern in the same orientation or with an orientation extending transversely to one another are preferably used. Alternatively thereto, the fiber structure can also be built up using three-dimensional weaving and/or braiding techniques. A filament winding method may also be used, where applicable, depending on the ceramic process used. The carbon fiber filaments 126 are embedded into a matrix 130 consisting of the precursor polymer.

Following the complete hardening of the precursor polymer 130, which can take place at an elevated temperature of, for example, 200° C., the inner shell preliminary member is pyrolyzed in a protective gas atmosphere, for example, a nitrogen atmosphere at a temperature of 800° C. to 900° C. During the pyrolysis, the precursor matrix decomposes in such a manner that only a carbon rest remains.

The decomposition of the precursor matrix is combined with a decrease in volume. On account of the bonding between the carbon fibers and the matrix, the matrix cannot, however, shrink homogeneously and isotropically; rather, on account of the fiber-matrix bonding the hindrance of shrinkage results, as illustrated in FIG. 4, in the formation of microcracks 132, between which cells 134 which are isolated from one another are formed from bundles of carbon fiber filaments 126 embedded in a carbon matrix 136.

Therefore, a C/C material (carbon fiber-reinforced carbon) results with an open porosity of, typically, approximately 20%; i.e., the microcracks 132 form a coherent system of cavities which together take up approximately 20% of the total volume of the C/C material. The extension of the C/C material at right angles to the fiber layers 128 is reduced during the pyrolysis typically by a factor of 0.91.

The structure of the microcrack pattern resulting during the pyrolysis depends essentially on the strength of the fiber-matrix bonding. The strength of the fiber-matrix bonding in the fiber structure can be influenced as a whole or, if this is desired, only locally by a suitable pretreatment of the carbon fiber structure used, for example, by coating the fibers or by a thermal pretreatment.

Without any thermal pretreatment of the fiber structure, i.e., with a maximum strength of the fiber-matrix bonding, a microstructure such as that illustrated in FIG. 4 typically results which has essentially crack-free cells 134 consisting of, typically, 300 to 500 individual carbon fiber filaments 126 which are embedded into a dense carbon matrix 136.

If the carbon fiber structure is thermally pretreated prior to the production of the inner shell preliminary member at temperatures up to 900° C., the fiber matrix bonding decreases and so during the pyrolysis a C/C material results with a microstructure which still has a segmentation into C/C cells isolated from one another, wherein these C/C cells are, however, themselves penetrated by microcracks.

If the carbon fiber structure is thermally pretreated prior to the production of the inner shell preliminary member at a temperature of more than 900° C., the fiber matrix bonding decreases so considerably that the carbon fibers detach themselves from the shrinking matrix during the pyrolysis and maintain their original distance from one another. In this case, a C/C material results which has no segmentation into individual C/C cells but is essentially penetrated homogeneously by microcracks of the carbon matrix.

It is thus possible by means of a suitable, for example, thermal pretreatment of the carbon fiber structure to selectively adjust the porosity of the C/C material resulting during the pyrolysis with respect to its volume content and with respect to the microscopic distribution of the cavities. It is, in particular, possible as a result of this to selectively vary the volume content and the structure of the porosity of the material of the inner shell preliminary member in longitudinal direction of the inner shell preliminary member or in a radial direction of the inner shell preliminary member.

As already mentioned, the porosity of the C/C material resulting after the first pyrolysis is, typically, approximately 20%. If a lower degree of porosity is desired, the inner shell preliminary member is infiltrated with the precursor polymer after the first pyrolysis and subsequently pyrolyzed again. The porosity of the C/C material obtained decreases as a result of the procedure of reinfiltration and renewed pyrolysis. A predetermined degree of porosity can thus be attained in that the inner shell preliminary member is repeatedly infiltrated with the precursor polymer and subsequently pyrolyzed until the predetermined degree of porosity of the material of the inner shell preliminary member is attained.

If the inner shell preliminary member has the desired degree of porosity after one or repeated pyrolysis, the coolant passages 124 are formed on its outer side by means of mechanical treatment, for example, by milling. In this respect, the cross sections of the coolant passages may be varied in longitudinal direction of the inner shell preliminary member as a function of the heat flux to be absorbed locally.

In a next step, an outer shell preliminary member consisting of a carbon fiber-reinforced plastic is formed on the pyrolyzed inner shell preliminary member.

This can take place, for example, in that a carbon-fiber woven fabric is placed on the inner shell preliminary member and subsequently a precursor polymer is injected into the fiberwoven fabric. The carbon fiber-reinforced plastic material of the outer shell preliminary member has the structure illustrated in FIG. 3 and already described above.

Subsequently, the structural unit formed from the outer shell preliminary member and from the inner shell preliminary member is pyrolyzed as a whole in a protective gas atmosphere, for example, in a nitrogen atmosphere at a temperature in the range of 800° C. to 900° C. so that a C/C material also results from the material of the outer shell preliminary member, the structure of which is illustrated in FIG. 4 and has already been explained above.

The degree of porosity and the structure of the porosity of the porous C/C material of the outer shell preliminary member may be adjusted in the manner already described in conjunction with the production of the inner shell preliminary member, i.e. by means of a suitable pretreatment of the fiber structure prior to the formation of the outer shell preliminary member and/or by means of repeated infiltration of the outer shell preliminary member with the precursor polymer and subsequent renewed pyrolysis.

Finally, the structural unit consisting of porous C/C material and formed from the outer shell preliminary member and the inner shell preliminary member is supplied with silicon in order to create an inner shell 118 and an outer shell 120 of the combustion chamber 100 consisting of a dense, pore-free C/C—SiC material.

The supply of silicon to the structural unit preferably takes place by means of a liquid siliconizing process. In this respect, the structural unit is infiltrated with liquid silicon under vacuum at a temperature of approximately 1600° C. On account of the capillary effect, the liquid silicon passes into the pores of the porous C/C material of the inner shell preliminary member and the outer shell preliminary member and reacts at the wetting locations not only with the residual carbon of the matrix but also with individual carbon fiber filaments to form a ceramic silicon carbide matrix 138, into which the C/C cells or C/C strands 134 are embedded, as is apparent from FIG. 5.

The silicon carbide matrix thus closes the pores in the C/C material and forms a sheathing protecting the C/C cells from oxidation.

The production of the inner shell 118 and the outer shell 120 of the first embodiment of the combustion chamber 100 is thus completed.

In order to minimize the heat radiation at the outer side of the combustion chamber 100, an outer high-temperature insulation layer may be attached to the outer side of the outer shell 120. The attachment of such a heat-insulation layer may become necessary as a result of the installation conditions of the combustion chamber 100 in order to protect structural components arranged in the vicinity of the combustion chamber 100 from too great a thermal strain.

Furthermore, the inner side of the inner shell 118 of the combustion chamber 100 can be provided wholly or partially with a coating consisting of a TBC material. This coating can be applied to the inner side of the inner shell 118, for example, by spraying.

A second embodiment of a combustion chamber 100, which is illustrated in FIGS. 6 and 7 and is suitable for even higher combustion area temperatures and pressures, differs from the first embodiment described above in that the inner shell 118 of the combustion chamber 100 is not formed from a dense, pore-free C/C—SiC material but from a C/C material with an open porosity.

On account of the porosity of the inner shell 118, a proportion of the coolant flowing through the coolant passages 124 is pressed, during operation of the combustion chamber 100, through the inner shell 118 into the combustion area 104 where it forms along the inner side of the inner shell 118 a cooling boundary-layer film which shields the inner shell 118 from the hot products of combustion and considerably reduces the convective transfer of heat from the combustion area 104 into the inner shell 118. The flow of coolant through the porous inner shell 118 into the combustion area 104 is illustrated in FIGS. 6 and 7 by arrows 139.

Such a cooling process, with which the coolant is supplied to the combustion area 104 via a plurality of openings which are distributed over an inner boundary surface of the combustion area 104 in order to form a cooling boundary-layer film, is, as already explained at the outset, designated as transpiration cooling.

The coolant supplied during the transpiration cooling can be liquid or gaseous. When a liquid coolant is supplied to the combustion area 104, an additional cooling effect is achieved in that the coolant supplied vaporizes in the boundary-lay film formed and hereby absorbs latent heat.

So that the coolant can pass into the combustion area 104 from the coolant passages 124 through the porous inner shell 118, the pressure of the coolant in the coolant passages 124 must be higher than the pressure prevailing in the combustion area 104. With a combustion area pressure in the order of magnitude of 200 bars, a coolant pressure higher by 20 to 40 bars is typically used in the coolant passages 124.

Apart from its cooling effect, the boundary-layer film formed during the transpiration cooling offers the additional advantage that the oxidizing agent injected into the combustion area 104 is kept away from the material of the inner shell 118 and so a material sensitive to oxidation can also be used for the inner shell 118.

Furthermore, the porosity of the inner shell 118 offers the advantage that fluctuations in the combustion area pressure during the combustion are attenuated. The pores in the material of the inner shell 118 serve as compensatory volume, and microchannels with a small cross-sectional area, which are present in the porous material of the inner shell 118 and connect the pores with one another, act as a restrictor for a flow of fluid into these pores so that when the combustion area pressure rises a restricted flow of fluid into the pores of the inner shell 118 can take place and when the combustion area pressure drops a restricted flow of fluid out of the pores of the inner shell 118 into the combustion area 104 can take place. As a result of this compensatory volume accessible via a restrictor, the fluctuations in the combustion area pressure during the combustion are attenuated and pressure peaks which could lead to damage to the combustion chamber 100 are intercepted.

In order to produce the combustion chamber casing 106 of the second embodiment of a combustion chamber 100, the following steps are taken:

First of all, an inner shell preliminary member consisting of a carbon fiber-reinforced plastic is produced and pyrolyzed, where applicable several times, as already described in conjunction with the production of the first embodiment of a combustion chamber 100.

Subsequently, coolant passages 124 are formed on the outer side of the pyrolyzed inner shell preliminary member by mechanical treatment.

Since, however, in the case of the second embodiment of the combustion chamber 100 the inner shell 118 is intended to be maintained as a porous C/C structure, it is necessary to seal the outer side of the inner shell preliminary member facing the outer shell 120 prior to the application of the outer shell preliminary member in order to prevent any silicon from entering the inner shell 118 during the siliconization of the outer shell preliminary member.

For this purpose, the coolant passage surfaces 140 on the side of the inner shell can be provided with a separating agent, for example, with boron nitride (BN) after formation of the coolant passages 124.

Furthermore, the contact surfaces 122 arranged between every two coolant passages 124 are provided with a tightly sealing, pore-free contact layer. This contact layer can be produced, for example, by applying a ceramic slurry or by means of a plasma coating process.

Alternatively or supplementary to the sealing of the coolant passage surfaces 140 on the side of the inner shell with a separating agent, the coolant passages 124 may also be filled with a pasty, hardenable material. This material must have a sufficient temperature stability in order to withstand the temperatures occurring during the subsequent process steps of pyrolysis and liquid siliconization.

Once the inner shell 118 has been sealed in the manner described above, an outer shell preliminary member consisting of carbon fiber-reinforced plastic is applied to the pyrolyzed inner shell preliminary member and pyrolyzed in the manner already described in conjunction with the production of the first embodiment of the combustion chamber 100.

Subsequently, the pyrolyzed outer shell preliminary member is liquid siliconized in that the outer shell preliminary member is infiltrated with liquid silicon from its outer side and/or its end side under vacuum at a temperature of approximately 1600° C. The liquid silicon penetrates the pores of the C/C material of the outer shell preliminary member on account of the capillary effect but cannot overcome the sealed contact layer on the contact surfaces 122 of the inner shell 118 as well as the separating agent arranged on the coolant passage surfaces 140 on the side of the inner shell and so no liquid silicon passes into the inner shell 118.

Consequently, a dense, pore-free outer shell 120 consisting of a C/C—SiC material is formed during the liquid siliconization whereas the material of the inner shell 118 remains as a C/C material with an open porosity.

As in the case of the first embodiment of the combustion chamber 100, the outer shell 120 of the second embodiment can also be provided on its outer side, following the liquid siliconization, with an outer high-temperature insulation layer in order to reduce the heat radiation from the outer side of the combustion chamber 100.

Finally, the separating agent arranged on the coolant passage surfaces 140 on the side of the inner shell is removed in that the coolant passages 124 are flushed with a suitable acid or caustic solution or another suitable chemical which does not attack the C/C material of the inner shell 118 and the C/C—SiC material of the outer shell 120, or, at the most, to a slight extent, but dissolves the separating agent. To remove the separating agent boron nitride, hydrofluoric acid can, for example, be considered.

If the coolant passages 124 have been filled with a hardenable material prior to the application of the outer shell preliminary member, this material is also to be removed again in a chemical and/or mechanical manner following the siliconization of the outer shell 120.

As for the rest, the second embodiment of the combustion chamber 100 conforms to the first embodiment described above with respect to construction and function and reference is made to its description in this respect.

A third embodiment of a combustion chamber 100 illustrated in FIGS. 8 to 10 differs from the first embodiment described above in that the inner shell 118 has a transpiration cooling area 142 which is arranged in the region of the nozzle throat 116 and in which the inner shell 118 is not formed from a dense, pore-free C/C—SiC material but from a C/C material with an open porosity.

Furthermore, the inner shell 118 of the third embodiment is penetrated in an injection area 144 adjacent to the injection head 108 by injection passages 146 which are aligned essentially radially to the longitudinal axis 102 of the combustion chamber 100 and connect the coolant passages 124 to the combustion area 104.

The area of the inner shell 118 located between the transpiration cooling area 142 and the injection head 108 is provided with a coating 148 consisting of a TBC material, for example, of zirconium oxide ($ZrO_2$) or a thermally insulating compact ceramic. The area of the inner shell 118 located between the transpiration cooling area 142 and the injection passages 146 is designated in the following as film cooling area.

In the case of the third embodiment of the combustion chamber 100 with this construction, the cooling methods of regenerative cooling, transpiration cooling and film cooling are combined with one another during operation.

The coolant flowing in the coolant passages 124 in the direction towards the injection head 108, first of all, carries off heat from the combustion chamber casing 106 in the nozzle region 117 by way of regenerative cooling.

As a result of the porous transpiration cooling area 142 of the inner shell 118, a proportion of the coolant flowing through the coolant passages 124 can enter the combustion area 104 distributed over the inner side of the inner shell 118 and there form a cooling boundary-layer film.

The coolant remaining in the coolant passages 124 flows further to the injection head 108. A proportion of this coolant is injected into the combustion area 104 through the injection passages 146 in the injection area 144 of the inner shell 118 and forms on the inner side of the inner shell 118 coated with a TBC material an additional boundary-layer film which is carried along by the reaction gases found in the combustion area 104 in the direction towards the nozzle throat 116 and therefore moves along the inner side of the inner shell 118 from the injection area 144 to the transpiration cooling area 142 of the inner shell 118.

This boundary-layer film, in which a directed flow of the coolant takes place, shields the inner shell 118 from the hot products of reaction resulting during the combustion in the combustion area 104 in the same way as the boundary-layer film formed in the transpiration cooling area 142 which has essentially no directed flow of the coolant. Such cooling by means of a boundary-layer film, with which the coolant forming the boundary-layer film is supplied to the combustion area 104 upstream of the film cooling area 150 to be cooled, is designated as film cooling, as already explained at the outset.

The flow of coolant in the boundary-layer film is illustrated in FIG. 8 by arrows 151.

Apart from by way of the film cooling described above, the inner shell 118 is protected in the film cooling area 150 from an excessive thermal strain as a result of the coating 148 consisting of a TBC material which has a low heat conductivity.

During the production of the combustion chamber casing 106 of the third embodiment of the combustion chamber 100, the following steps are taken:

First of all, a preliminary member for the transpiration cooling area is produced from a carbon fiber-reinforced plastic and pyrolyzed to obtain a porous C/C material, as described above in conjunction with the production of the inner shell 118 of the first embodiment of the combustion chamber 100.

The preliminary member for the transpiration cooling area may be reinfiltrated once or several times with the precursor polymer and pyrolyzed again in order to set a desired degree of porosity.

Once the desired degree of porosity has been reached, sections 124a of the coolant passages 124 arranged on the outer side of the transpiration cooling area 142 are formed on the preliminary member of the transpiration cooling area by mechanical treatment.

In order to prevent silicon from being able to pass into the transpiration cooling area 142 during any later siliconization process, the coolant passage surfaces 140a on the side of the inner shell of the sections 124a of the coolant passages 124 arranged at the transpiration cooling area 142 are provided with a separating agent, for example, with boron nitride (BN).

Furthermore, the contact surfaces 122a arranged between every two coolant passage sections 124a as well as a contact surface 152 limiting the transpiration cooling area 142 towards the film cooling area 150 and a contact surface 154 limiting the transpiration cooling area 142 towards the nozzle region 117 are sealed by means of a plasma coating process or by application of a ceramic slurry so as to be pore-free.

Thereupon, the remaining inner shell 118 as well as the outer shell 120 of the third embodiment of the combustion chamber 100 are formed in the same way as that already described in conjunction with the production of the embodiment of the combustion chamber 100.

During liquid siliconization, the liquid silicon is supplied from the outer side of the outer shell 120 so that the liquid silicon cannot enter the transpiration cooling area 142 of the inner shell 118 on account of the sealing of the contact surfaces 122a, 152 and 154 as well as on account of the separating agent arranged on the coolant passage surfaces 140a on the side of the inner shell and thus a porous C/C material is maintained in this region.

Following the step of liquid siliconization, the area of the inner shell 118 located between the transpiration cooling area 142 and the injection head 108 is provided, for example, by means of spraying with the coating 148 consisting of a TBC material.

Finally, the injection passages 146 connecting the coolant passages 124 with the combustion area 104 are formed in the inner shell 118 by way of mechanical treatment, for example, by boring.

As for the rest, the third embodiment of the combustion chamber 100 conforms to the first embodiment described above and so in this respect reference is made to the description of the first embodiment.

A fourth embodiment of a combustion chamber 100 illustrated in FIGS. 11 and 12 differs from the third embodiment described above in that the injection passages 146 of the injection area 144 do not open directly into the combustion area 104 of the combustion chamber 100 but via an injection gap.

As is apparent from FIGS. 11 and 12, an annular injection gap 156 is arranged in the injection area 144 of the inner shell 118 of the combustion chamber 100 coaxially to the longitudinal axis 102 of the combustion chamber 100 such that it opens, on the one hand, into the injection passages 146 and, on the other hand, into the combustion area 104.

The annular injection gap 156 forms a small angle with the inner side of the inner shell 118 such that the coolant, which flows out of the coolant passages 124 through the injection passages 146 into the injection gap 156, enters the combustion area 104 essentially tangential to the inner side of the inner shell 118 and there forms the boundary-layer film required for a film cooling of the film cooling area 150 of the inner shell 118.

As for the rest, the fourth embodiment of the combustion chamber 100 conforms to the third embodiment described with respect to construction and function and reference to its description in this respect.

The production of the combustion chamber casing 106 of the fourth embodiment of the combustion chamber 100 is carried out in the same way as described in the above in conjunction with the production of the combustion chamber casing 106 of the third embodiment of the combustion chamber 100, wherein the annular injection gap 156 connecting the injection passages 146 with the combustion area 104 is formed in the inner shell 118 by means of mechanical treatment.

An injection gap for blowing coolant into the combustion area to form a cooling boundary-layer film can also be designed as an annular gap in the injection head 108. In this case, it is possible to align the annular gap exactly parallel to the inner side of the inner shell 118 of the combustion chamber 100 so that the coolant forming the boundary-layer film can be blown in exactly tangential to the inner side of the inner shell.

What is claimed is:

1. A combustion chamber comprising:
   a combustion area,
   an inner shell surrounding the combustion area,
   an outer shell surrounding the inner shell, and
   coolant passages formed between the inner shell and the outer shell,
   wherein the inner shell is formed from one of: (i) graphite and (ii) a fibrous ceramic material comprising carbon fiber-reinforced carbon consisting of carbon fibers embedded in a carbon matrix.

2. A combustion chamber as defined in claim 1, wherein the outer shell is formed from a material which has a coefficient of thermal expansion which is substantially the same as a coefficient of thermal expansion of a material which forms the inner shell.

3. A combustion chamber as defined in claim 1, wherein a fibrous ceramic material of the outer shell comprises carbon fiber-reinforced carbon.

4. A combustion chamber as defined in claim 1, wherein the material of the outer shell has no porosity.

5. A combustion chamber as defined in claim 4, wherein the material of the outer shell comprises a carbon fiber-reinforced silicon carbide.

6. A combustion chamber as defined in claim 5, wherein the material of the outer shell comprises a C/C—SiC material.

7. A combustion chamber as defined in claim 1, wherein the material of the inner shell has no porosity.

8. A combustion chamber as defined in claim 7, wherein the material of the inner shell comprises a carbon fiber-reinforced silicon carbide.

9. A combustion chamber as defined in claim 8, wherein the material of the inner shell comprises a C/C—SiC material.

10. A combustion chamber as defined in claim 1, wherein the material of the inner shell comprises a material with an open porosity.

11. A combustion chamber as defined in claim 10, wherein the degree of porosity of the material of the inner shell having an open porosity varies in a radial direction of the combustion chamber.

12. A combustion chamber as defined in claim 11, wherein the degree of porosity of the material of the inner shell having an open porosity increases towards the inner side of the inner shell.

13. A combustion chamber as defined in claim 10, wherein the degree of porosity of the material of the inner shell having an open porosity varies in a longitudinal direction of the combustion chamber.

14. A combustion chamber as defined in claim 1, wherein:
 the inner shell of the combustion chamber has a coolant supply area for supplying coolant to the combustion area,
 the inner shell of the combustion chamber has a film cooling area comprising no porous material, and
 the film cooling area follows the coolant supply area in a longitudinal direction of the combustion chamber.

15. A combustion chamber as defined in claim 14, wherein the coolant supply area of the inner shell comprises a material with an open porosity.

16. A combustion chamber as defined in claim 14, wherein the coolant supply area of the inner shell is penetrated by at least one injection passage connecting a coolant passage with the combustion area.

17. A combustion chamber as defined in claim 14, wherein the inner shell of the combustion chamber has a transpiration cooling area comprising, a material with an open porosity and following the film cooling area in the longitudinal direction of the combustion chamber.

18. A combustion chamber as defined in claim 1, wherein one area of the inner shell has a coating consisting of a TBC material on its inner side.

19. A combustion chamber as defined in claim 1, wherein the coolant passages have a cross section varying in a longitudinal direction of the combustion chamber.

20. A combustion chamber as defined claim 1, wherein the combustion chamber has an injection head formed from a fibrous ceramic material.

21. A combustion chamber as defined in claim 20, wherein the injection head is designed in one piece with at least one of the inner shell and the outer shell.

22. A combustion chamber as defined in claim 20, wherein the material of the injection head comprises a material with an open porosity.

* * * * *

UNITED STATES PATENT AND TRADEMARK OFFICE
CERTIFICATE OF CORRECTION

| | |
|---|---|
| PATENT NO. : 6,151,887 | Page 1 of 1 |
| DATED : November 28, 2000 | |
| INVENTOR(S) : Haidn et al. | |

It is certified that error appears in the above-identified patent and that said Letters Patent is hereby corrected as shown below:

Title page,
The title should read : [54] COMBUSTION CHAMBER

Signed and Sealed this

Twenty fifth Day of September, 2001

Attest:

NICHOLAS P. GODICI
Attesting Officer
Acting Director of the United States Patent and Trademark Office